US009163965B2

(12) United States Patent
Fouillet et al.

(10) Patent No.: US 9,163,965 B2
(45) Date of Patent: Oct. 20, 2015

(54) MICROFLOWMETER AND METHOD FOR MAKING SAME (75) Inventors: Yves Fouillet, Voreppe (FR); Alain Bourgerette, Villard-Bonnot (FR); Olivier Fuchs, Fontaine (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 72 days.

(21) Appl. No.: 14/114,445

(22) PCT Filed: Apr. 27, 2012

(86) PCT No.: PCT/EP2012/057855
§ 371 (c)(1),
(2), (4) Date: Oct. 28, 2013

(87) PCT Pub. No.: WO2012/146756
PCT Pub. Date: Nov. 1, 2012

(65) Prior Publication Data
US 2014/0060206 A1 Mar. 6, 2014

(30) Foreign Application Priority Data
Apr. 28, 2011 (FR) ...................... 11 53646

(51) Int. Cl.
*G01F 1/37* (2006.01)
*G01F 1/40* (2006.01)
*G01F 1/38* (2006.01)

(52) U.S. Cl.
CPC ... *G01F 1/40* (2013.01); *G01F 1/38* (2013.01)

(58) Field of Classification Search
CPC .............. G01F 1/37; G01F 1/34; G01F 1/38; G01P 5/06; G01L 7/00; G01L 7/08; G01L 9/06
USPC ............... 73/861.52, 861.85, 861.42, 861.47, 73/721, 715, 756
See application file for complete search history.

(56) References Cited

U.S. PATENT DOCUMENTS

| 4,221,134 A * | 9/1980 | Ekstrom, Jr. ..................... 73/721 |
| 4,565,096 A * | 1/1986 | Knecht ............................. 73/718 |
| 4,817,022 A * | 3/1989 | Jornod et al. ................... 702/98 |
| 5,959,213 A * | 9/1999 | Ikeda et al. ..................... 73/720 |
| 5,969,591 A * | 10/1999 | Fung ............................... 338/42 |
| 6,446,513 B1 | 9/2002 | Henderson |
| 6,474,168 B1 * | 11/2002 | Meringdal ....................... 73/715 |

(Continued)

FOREIGN PATENT DOCUMENTS

| CN | 101454645 A | 6/2009 |
| EP | 1 236 974 | 9/2002 |

(Continued)

OTHER PUBLICATIONS

U.S. Appl. No. 14/114,009, filed Oct. 25, 2013, Fouillet, et al.

(Continued)

*Primary Examiner* — Jewel V Thompson
(74) *Attorney, Agent, or Firm* — Oblon, McClelland, Maier & Neustadt, L.L.P.

(57) ABSTRACT

A flowmeter includes a first chamber and a second chamber connected through a channel. The first chamber is provided with a first deformable membrane and with first and second gauges. The second chamber is provided with a second deformable membrane and with third and fourth gauges. The four gauges form a Wheatstone bridge.

22 Claims, 6 Drawing Sheets (56) References Cited

U.S. PATENT DOCUMENTS

| | | | |
|---|---|---|---|
| 6,898,981 B1 * | 5/2005 | Boillat et al. | 73/756 |
| 7,703,339 B2 * | 4/2010 | Sulouff et al. | 73/861.85 |
| 8,601,885 B2 | 12/2013 | Delapierre et al. | |
| 2005/0204828 A1 | 9/2005 | Lee et al. | |
| 2007/0295103 A1 | 12/2007 | Dai et al. | |
| 2011/0290037 A1 | 12/2011 | Delapierre et al. | |

FOREIGN PATENT DOCUMENTS

| | | |
|---|---|---|
| GB | 2 091 429 B | 8/1984 |
| JP | 2008-534922 | 8/2008 |
| WO | 2007 143258 | 12/2007 |
| WO | WO 2010/092092 A1 | 8/2010 |

OTHER PUBLICATIONS

Van Der Wie, A. J., et al., "A Bi-Directional Silicon Orifice Flow Sensor Characterised for Fluid Temperature and Pressure", The 8th International Conference on Solid-State Sensors and Actuators and Euro sensor IX. Stockholm, Sweden, vol. 2, pp. 420-423, XP010305091,(Jun. 1995).

Yaxin, L., et al., "A MEMS Flow Sensor and Its Application in Adaptive Liquid Dispensing", 2009 International Conference on Measuring Technology and Mechatronics Automation, pp. 3-7, XP031511148, (Apr. 2009).

International Search Report Issued Sep. 5, 2012 in PCT/EP12/57855 Filed Apr. 27, 2012.

French Preliminary Search Report issued Dec. 13, 2011 in Patent Application No. 1153646 (with English translation of categories of cited documents).

R.E. Oosterbroek, et al., "A micromachined pressure/flow-sensor", Sensors and Actuators, vol. 77, 1999, pp. 167-177.

Steve T. Cho, et al., "A high-performance microflowmeter with built-in self test," Sensors and Actuators A, vol. 36, 1993, pp. 47-56.

Z.J. Pei, et al., "Grinding of silicon wafers: A review from historical perspectives", International Journal of Machine Tools & Manufacture, vol. 48, 2008, pp. 1297-1307.

C. Malhaire, et al., "Design of a polysilicon-on-insulator pressure sensor with original polysilicon layout for harsh environment", Thin Solid Films, vol. 427, 2003, pp. 362-366.

Ali Boukabache, et al., "Microcapteurs de pression," Revue Scientifique Techniques de l'Ingénieur, No. 01657, 2001, pp. R 2 070-1 to R 2 070-9.

Nadim Maluf, et al, "An introduction to microelectromechanical systems engineering", Microelectromechanical Systems Series, Second Edition, 2004, 296 Pages.

U.S. Appl. No. 14/406,795, filed Dec. 10, 2014, Marchalot, et al.

Office Action issued Jun. 18, 2015, in Chinese Patent Application No. 201280032800.0 (w/English-language translation).

* cited by examiner

MICROFLOWMETER AND METHOD FOR MAKING SAME

TECHNICAL FIELD AND PRIOR ART

The present invention relates to techniques for measuring flow rates of a fluid. It notably relates to a device or microdevice and to its manufacturing method, applying a measurement of flow rate by means of a Wheatstone bridge allowing measurement of a pressure difference between two chambers.

There exist many methods for measuring flow rate (hot wire, Coriolis effect . . . ).

One effective, accurate and simple method consists of using two pressure sensors positioned consecutively in a fluidic passage and separated by a fluidic restriction. The pressure difference (called pressure drop) induced by the viscous dissipation in the fluidic restriction is measured with two pressure sensors. There is a known proportionality relationship between the flow rate and the pressure difference. Thus, the measurement of the pressure difference allows determination of the flow rate.

Figure 1:
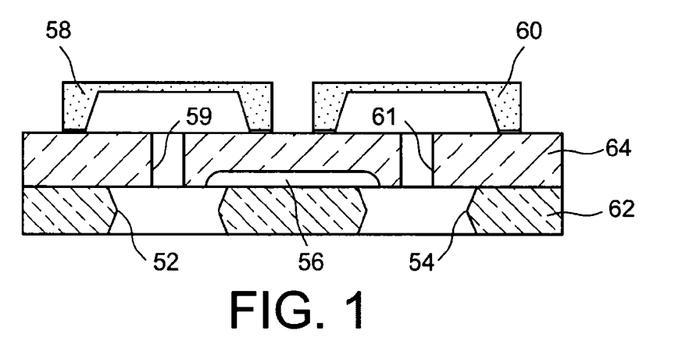
FIG. 1 already described, is a cross-sectional view of a microflowmeter according to an example of the prior art.

An exemplary flowmeter formed with two distinct pressure sensors is illustrated in FIG. 1 and is described in documents U.S. Pat. No. 6,446,513B1, US20050204828A1 as well as in the article of R. E. Oosterbroek et al., published in Sensor Actuate. a-Phys 77, 167 (1999). The fluid passes through a central channel 56 after having entered through an inlet aperture 51 positioned in the lower portion of the device. It flows out through an outlet aperture 54, also positioned in the lower portion of the device. Piezo-resistive sensors, 58, 60 allow measurement of the pressure variations, in the inlet portion upstream from the channel 56 on the one hand, in the outlet portion downstream from the channel 56 on the other hand. The device is made by means of two substrates 62, 64, the inlet 52 and outlet 54 channels being made in the lower substrate 62, the central channel being as for it made in the lower portion of the upper substrate 64, wherein two through-channels allow access to the piezo-resistive sensors, on the side of the inlet and on the side of the outlet of the device, respectively.

Another configuration consists of using a single pressure difference sensor, each face of a membrane forming the pressure sensor facing chambers separated by a pressure drop. An example thereof is described in the article of Cho et al., 1993, entitled <<a high-performance microflowmeter with built-in self-test>>, published in Sensors and Actuators A: Physical 36:47-56. However, for electric insulation reasons, it is preferable to properly separate the measurement means (the sensor and the electric means) from the fluidic portions. As the measurement means are on one of the faces of the membrane of the pressure sensor, it is not possible to use a configuration with a differential sensor, which necessarily involves the contacting of the fluid with both of these faces. For architectural reasons, it is also preferable to separate the electric levels from the fluidic levels.

Figure 2:
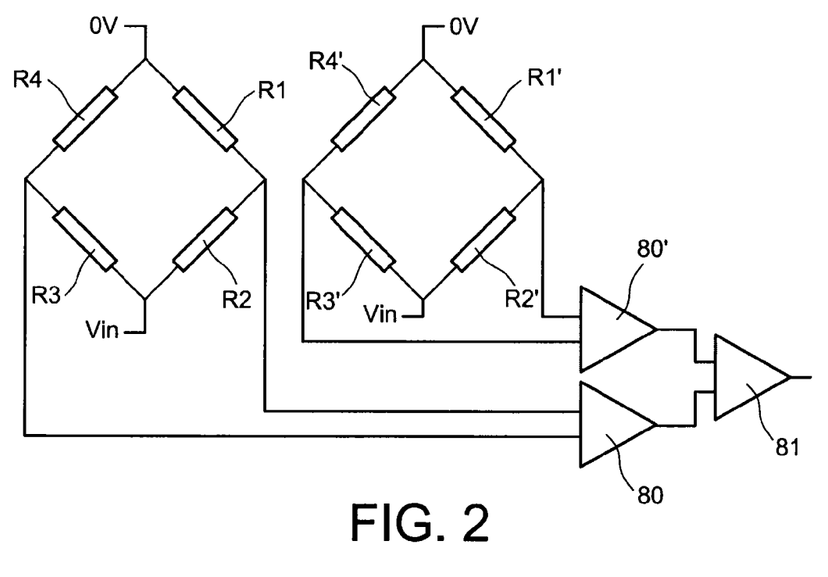
FIG. 2 is a schematic view of an electric diagram.

Moreover electric circuits are known, with Wheatstone bridges, each bridge including 4 resistors R1-R4 and R'1-R'4, as illustrated in FIG. 2, which also shows the electric connections involved in such a system.

This circuit requires at least 8 connection pads 76.

Further, the measurement chain of a Wheatstone bridge involves electronics formed with several components, notably an electric amplifier, and an analog/digital converter. With two bridges, like in FIG. 2, two measurements have to be amplified and their difference determined. The latter may be calculated after analog conversion but, in order to minimize degradation of the information, it is preferable to determine the difference before the analog conversion. The measurement chain therefore involves at least 3 differential amplifiers 80, 80', 81. Now each amplifier has to be powered. This type of circuit is therefore bulky and involves significant consumption of electricity.

Therefore the problem is posed of finding a novel flow rate measurement device, allowing reduction of the drawbacks explained above for the devices of the prior art.

DISCUSSION OF THE INVENTION

A first aspect of the invention relates to a flowmeter or a microflowmeter, which may be of the MEMS type, including a first chamber and a second chamber connected through a channel, the first chamber being provided with a first deformable membrane (or a wall of this first chamber including a first deformable membrane), and including first and second gauges, the second chamber being provided with a second deformable membrane (or a wall of the second chamber including a second deformable membrane), and including third and fourth gauges, the four gauges forming a Wheatstone bridge.

Each gauge is able to provide a signal which is characteristic of deformation of the corresponding membrane, a deformation occurring under the action of a flow of a fluid in the flowmeter.

The four gauges form a Wheatstone bridge allowing measurement of a pressure difference between the first chamber and the second chamber when a fluid flows through the first chamber, and then through the channel and then through the second chamber.

Such a flowmeter may be integrated into a single component.

It includes two membranes, each facing a cavity, both cavities being separated by a pressure drop formed by a first channel with a small section. Such a device further includes measurement means in the form of a Wheatstone bridge including two gauges associated with, or on, the first membrane and 2 gauges associated with, or on, the second membrane. A single Wheatstone bridge gives the possibility of conducting the measurement of the flow rate of a fluid flowing in the flowmeter.

The use of a Wheatstone bridge including resistors positioned in both chambers allows simplification of the whole of the electric cabling as well as a reduction in the energy consumed by the measurement.

In such a device, one of the gauges of each membrane is advantageously placed along a direction perpendicular to the general direction of flow of a fluid in the device, while the other gauge is placed along a direction substantially parallel with this general direction of flow of the fluid in the device. Such an arrangement gives the possibility of ensuring a highly sensitive measurement.

Still preferably, each of the gauges is localized in the vicinity of the anchoring or of the edge of the corresponding membrane.

Such a device may further include measurement means, including amplifier means, or a single amplifier, to which are connected 2 apices of the bridge which are not positioned in the vicinity of each other in the bridge. It is thereby possible to conduct a differential measurement, which allows reduction of the risks of degrading the information and of minimizing the measurement uncertainty.

In the present application, a method for making a flowmeter of the type described above is also described, including the following steps:

a) a first substrate and a second substrate are selected,
b) the first chamber, the second chamber and the channel are made in the second substrate,
c) the first substrate is assembled with the second substrate,
d) a deformable membrane is then made by thinning the first substrate,
e) the 4 gauges forming a Wheatstone bridge on or in said membrane are formed, 2 of the gauges being positioned above the first chamber and the two other gauges being positioned above the second chamber.

In the present application, a method for making a flowmeter is also described including the following steps:
a) a first substrate and a second substrate are selected,
b) in the second substrate are made a first chamber, a second chamber and a channel which connects both chambers,
c) the first substrate is assembled with the second substrate,
d) a first deformable membrane, and a second deformable membrane are then made, respectively associated with or located above the first chamber and the second chamber, by thinning the first substrate,
e) 4 gauges forming a Wheatstone bridge are formed on or in said membrane, two of the gauges being positioned above the first chamber and the two other gauges being positioned above the second chamber.

In either one of the methods above, the deformable membrane may be made by thinning the first substrate from the upper face of the latter, by mechanical polishing or by mechano-chemical polishing and/or by etching.

The first substrate may be of the SOI type, including a semiconducting substrate, a dielectric layer and a layer in semiconducting material.

The dielectric layer may be used as a stopping layer during the thinning of this first substrate.

Such a method may further include a step for making inlet and outlet conduits in the second substrate. These conduits may first be made blind, in the second substrate, and then be made as through-conduits after step e) by thinning the second substrate.

The assembling step is preferably performed by molecular sealing, by anodic, eutectic sealing, or by adhesive bonding. It may be carried out in vacuo.

The gauges as for them may be made by metal deposition on the membrane or by doping a semiconducting material.

In a device or a method as described in the present application, it will preferably be sought to have the 4 gauges of the Wheatstone bridge not all parallel with each other, and/or the 2 gauges of the bridge and of a same membrane not parallel with each other, and/or have the Wheatstone bridge include two successive gauges parallel relatively to each other.

SHORT DESCRIPTION OF THE DRAWINGS

As non-limiting examples, embodiments of the invention will now be described, with reference to the appended drawings, wherein.

DETAILED DISCUSSION OF PARTICULAR EMBODIMENTS

In the following, when one refers to a <<substrate>>, it may also comprise a <<layer>>. Therefore either one of these terms are used equally.

It should be noted that in the drawings, the scales are not observed in order to promote clarity of the drawing.

Figure 3:
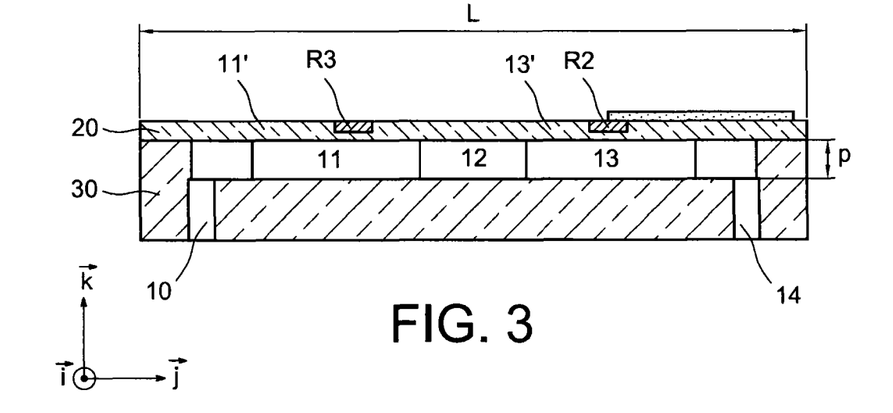
FIGS. 3, 4A and 4B, 4C are schematic views of a flowmeter according to the present invention (FIGS. 3, 4A, 4C) and of the electric diagram for mounting the sensors associated with this flowmeter (FIG. 4B) respectively.

In all the description which follows, an orthonormal reference system ($\underline{i}, \underline{j}, \underline{k}$), is used, as illustrated in FIG. 3.

Moreover, the terms of <<lower>> and <<upper>> used subsequently should here be understood in terms of orientation along the direction $\underline{k}$ of the orthonormal reference system ($\underline{i}, \underline{j}, \underline{k}$).

The terms of <<thickness>>, <<height>> and <<depth>> should be understood in terms of a measurement or of a distance along the direction $\underline{k}$ of the same orthonormal reference system ($\underline{i}, \underline{j}, \underline{k}$).

Figure 4A:
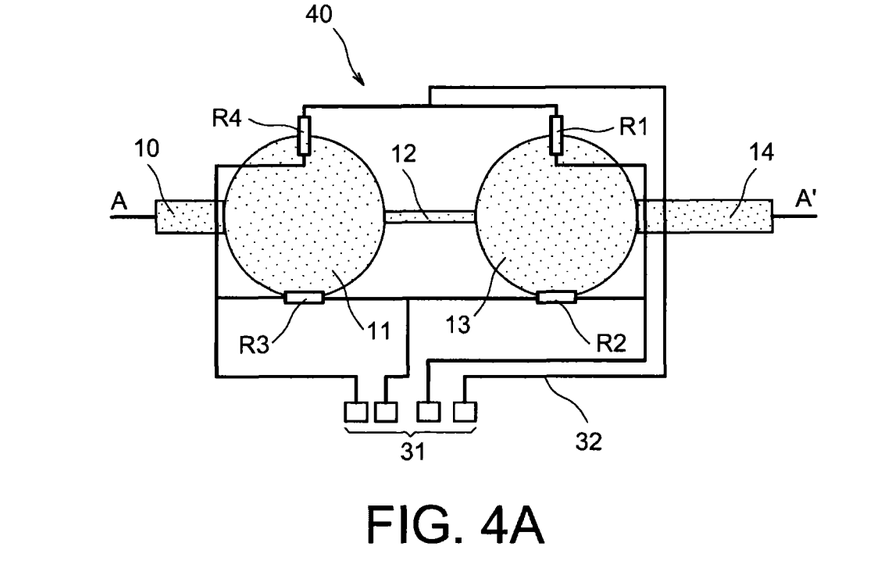
Figure 4B:
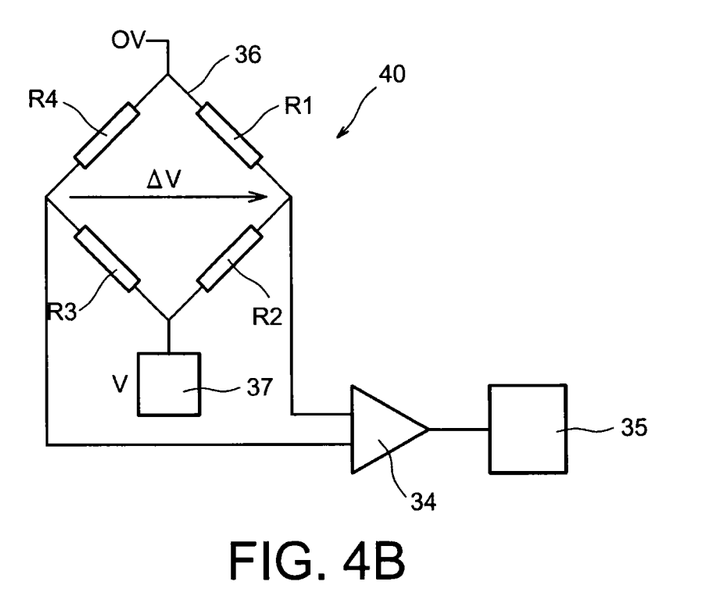
Figure 4C:
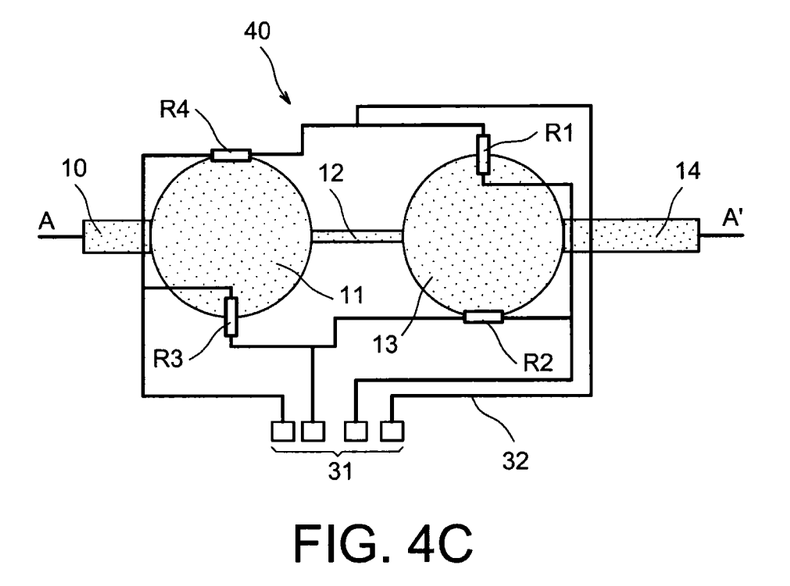

A first exemplary structure according to the invention is illustrated in FIGS. 3 and 4A-4C. FIG. 3 is a sectional view along a plane, the path AA' of which is seen in FIG. 4A or 4C (top views). The views of FIGS. 4A and 4C are alternatives in the arrangement of the resistors of the bridge.

Such a device includes 2 membranes 11', 13' positioned facing 2 cavities (or chambers) 11, 13. The latter are connected together through a small channel with a small section. This channel will impose a pressure drop to a liquid which flows from an inlet 10, and then into the first cavity 11 and then passes into the second cavity 13 so as to be directed towards an outlet orifice 14.

Figure 5:
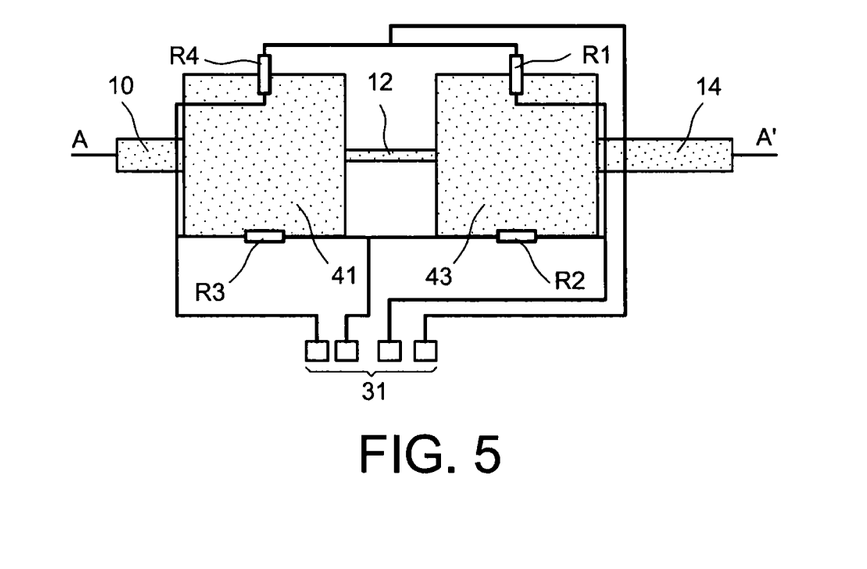
FIG. 5 is a schematic top view of an alternative of a flowmeter according to the present invention, FIGS. 6A-6F schematically illustrate various steps of a method for making a flowmeter according to the present invention.

The cavities 11, 13 may each have in the ij plane, or plane of the device, a circular shape or a disc shape (clearly illustrated in FIGS. 4A, 4C), the diameter of which may be of the order of a few millimeters, for example comprised between 1 mm and 10 mm. Alternatively, these cavities may be square or rectangular, this alternative is schematically illustrated in FIG. 5 and will be commented on subsequently.

The cavities have a depth p, measured along the direction k, of the order of a few microns to a few hundred microns, for example comprised between 10 μm or 50 μm and 100 μm. Preferably the depths, measured along the direction k, of the different channels 10, 11, 12, 13, 14 are similar or are identical. In order to form a narrower restriction, the depth of the channel 12 may be less than that of the cavities 11, 13. The pressure drop produced by the restriction is all the greater since the restriction is of small section. Thus, the pressure difference of the fluid in the chambers 11 and 13 is all the higher. This increases the accuracy of the measurement of the flow rate of the fluid between both chambers, as this will be described subsequently.

The channel 12 may have a width, measured along an axis parallel to the j axis, perpendicular to the direction of flow of a fluid in the device, of a few tens of microns, for example comprised between 10 μm and 50 μm, while the other communication channels 10, 14 preferably have a larger width, of the order of a few hundred microns, for example comprised between 100 μm and 500 μm.

Such a structure may be made in two substrates 20, 30 superposed on each other and assembled with each other.

Each of these substrates has a thickness for example comprised between 100 μm and a few hundred μm, for example between 100 μm and 500 μm.

Each of the substrates extends in the ij plane, perpendicular to the k axis. For this reason, the ij plane is also called the plane of the device or main plane of the device. The j axis is in the direction of flow of a fluid in the device and the i axis is perpendicular to it. The thickness of each substrate, measured along this axis k, may in certain cases be very small relatively to the side extensions of the device, i.e. relatively to the device dimensions L and l measured in the plane ij; L (measured along the j axis) is for example comprised between a few millimeters, for example 2 mm or 5 mm, and a few centimeters, for example 2 cm or 5 cm, and l (measured along the i axis) is for example comprised between a few mm, for example 2 mm or 5 mm, and a few cm, for example 2 cm or 5 cm. The substrates 20, 30 may each be in a semiconducting material, for example in silicon or in another material such as glass, or metal, or polymer, or plastic. Silicon is preferred since it is compatible with collective and accurate manufacturing microtechnologies. Further, this material has good mechanical strength and ageing properties. In the case when the material is silicon, the substrates are bound together for example by molecular assembling, or by adhesive bonding, for example bonding by screen printing. Molecular sealing has the advantage of not requiring addition of an adhesive.

A pressure drop measurement of a fluid is conducted by means of a Wheatstone bridge 40 including 2 gauges (R3, R4) on, or in, the first membrane 11' and 2 gauges (R1, R2) on, or in, the second membrane 13'.

These gauges are preferably in a conducting material or in a doped semiconducting material. They are for example in gold, or in aluminium, or titanium or in platinum or in an alloy (for example AlSi). Preferably, a conducting material is selected having a high gauge factor, for example platinum. Alternatively they are made in a doped semiconducting material such as for example p-doped silicon obtained by implanting boron ions. A sensor made by means of gauges in a semiconducting material (for example boron-doped silicon at a dosage of a few $10^{19}$ at.cm$^{-3}$) provides sensitivity which is 50 to 100 times greater than a sensor using metal gauges.

Each of the gauges may be of an elongated shape, with a width of a few microns, which may be comprised between 1 μm and 9 μm or 10 μm, and a length of a few tens of microns, which may be comprised between 10 μm and 100 μm.

The 4 resistances R1, R2, R3, R4 are preferably identical rated values R0 (i.e. without any deformation).

Still preferably, the orientation of these 4 strain gauges is such that the flow rate measurement is the most sensitive. For example, if the membranes 11', 13' each have a circular shape, as illustrated in FIG. 4A or 4C, one of the gauges of each membrane is placed on a radial direction of the latter (R4 or R1 in FIG. 4A; R3 or R1 in FIG. 4C), while the second one (R2 or R3 in FIG. 4A; R4 or R2 in FIG. 4C) is placed along an angular direction, or is placed so as to form when projected on a plane defined by the pair of vectors (i, j), or on a plane parallel to the main plain of the device, an angle here substantially close to a right angle, with the limit of the anchoring area or of the contour of the membrane, in this case with the radius of the circle formed by the membrane, at the location where this gauge is placed.

Generally, regardless of the shape of the membrane, it is preferable that the resistors be not all parallel with each other.

It is preferable that the resistors positioned on or in a same membrane be not parallel with each other. They are advantageously perpendicular relatively to each other. For example, a membrane may include a resistor oriented radially, the other resistor being oriented tangentially, like in FIG. 4A or 4C. But other configurations are possible, with two gauges associated with the same cavity forming between them an angle strictly greater than 0° and strictly less than or equal to 90°, both gauges of the other cavity forming between them an angle strictly greater than 0° and strictly less than or equal to 90°.

Preferably, the Wheatstone bridge formed by the four resistors includes two successive resistors parallel with each other. This is the case in FIGS. 4A and 4B where the two resistors R2 and R3 successively positioned in the bridge, are parallel with each other, as well as the 2 resistors R1 and R4.

As this is seen in FIG. 4A, 4B or 4C, the gauges R1-R4 are connected together through electric lines 36, so that the whole forms a Wheatstone bridge. The apices of the bridge are connected to contact pads 31, which allows connection of the flowmeter to an electronic measurement system 34, 35, including an amplifier 34 and, optionally memory storage means and/or data processing means, for example means of the microprocessor type, further for example computer means. With a viewing screen (not shown in the figures) an operator may examine the time-dependent change in the flow rate data during the flow of a fluid.

The 2 membranes 11', 13' are preferably identical (same geometry, same size, and same stiffness). As this may be seen in FIG. 4A or 4C, the projection on a plane parallel to the plane defined by the axes (i, j), or on a plane parallel to the main plain of the device, of each of the gauges is preferably localized in the vicinity of the edge, or of the anchoring (in the substrate in which it is made) of the corresponding membrane, there where stress is maximum.

In the case when the material of the substrate in which the device is made, is silicon, the strain gauges are preferably oriented along the <010> directions of the crystalline lattice of the silicon. This allows maximization of the piezo-resistive effect: the gauges are then more sensitive.

Other deformation sensors may be present on, or in, the membranes 11', 13' for example in order to measure the pressure in either one of the membranes.

When a fluid flows in the whole of the network formed by the inlet 10, the first chamber 11, the channel 12, the second chamber 13 and the outlet 14, the pressure drop generated by the restriction 12 induces a pressure difference between the cavities 11 and 13.

If Pa and Pb designate the respective pressures in the chambers 11 and 13, the pressure drop generated in the restriction 12 is preferably greater than the pressure drop generated in the other inlet and outlet communication channels 10, 14.

As an example, it is recalled that for a channel with a square section of side d, and of length L, the pressure drop is written as:

$$\Delta P = 28.4 \frac{\mu L}{d^2} \langle Q \rangle$$

wherein μ is the viscosity of the liquid and Q is the rate of flow. For simplification, the following relationship will be used:

$$Pa-Pb=\alpha Q, \qquad (\text{eq. 1})$$

wherein Q designates the flow rate in the flowmeter and α is a coefficient depending on the geometry of the restriction 12 and on the viscosity of the fluid. This formula may therefore be applied to any geometry of the section of the channel along the j axis (or in the ik plane).

Under the action of pressure, the membranes 11', 13' facing each cavity 11, 13 deform. As the material forming the membranes has a substantially elastic behaviour, a linear relationship between the pressure and the deformation of the membranes is obtained to the first order, and therefore a linear relationship between the relative variation of the resistance of the gauges and the pressure of the cavities.

Let K be this proportionality relationship $$\left(\frac{\Delta R}{R} = KP\right).$$

The value of K depends on the stiffness of the membranes, on the position of the gauges and on the piezo-resistive properties of the gauges. The coefficient K also depends on the orientation of the gauges. The gauges which are positioned along respective axial and angular orientations (as explained above in connection with FIG. 4A) have coefficients K of opposite signs. Thus, for the resistances of the first membrane 11', subject to a pressure Pa, one obtains, respectively for a $1^{st}$ resistor R4 positioned radially and for a second resistor R3 substantially positioned at 90° from the $1^{st}$:

$$R4 = R0(1-KPa)$$

$$R3 = R0(1+KPa)$$

Also, for the second membrane 13' subject to a pressure Pb one obtains:

$$R1 = R0(1-KPb)$$

$$R2 = R0(1+KPb)$$

The bridge is powered by voltage V supply means 37. The imbalance, i.e. the potential difference ΔV of the Wheatstone bridge is given by the relationship:

$$\frac{\Delta V}{V} = \frac{R_1 R_3 - R_2 R_4}{(R_1 + R_2)(R_3 + R_4)}$$

(except for the sign which depends on the convention of the signs of the voltages).

As the resistance variations are much smaller than the rated value of the gauges (ΔR<<R0) the following equation (2) is obtained:

$$\frac{\Delta V}{V} = \frac{K}{2}(Pa - Pb)$$

By combining equations (1) and (2), it is found that:

$$\frac{\Delta V}{V} = \frac{K}{2} \alpha Q \qquad (3)$$

For the other relative orientations of the gauges, these formulae will be adapted.

As already explained above, generally, it is preferable that the resistors be not all parallel with each other, and/or that the resistors positioned on a same membrane be not parallel with each other and/or that the Wheatstone bridge formed by the four resistors include two successive resistors parallel with each other.

Equation (3) shows that the Wheatstone bridge configuration described above gives the possibility of obtaining a direct relationship between the flow rate Q, and the imbalance ΔV measured on the bridge.

Thus, in the case of the structure of FIG. 4C, the following equation (2') is obtained with the same meanings for the parameters V, K, Pa and Pb:

$$\frac{\Delta V}{V} = \frac{K}{2}(Pa + Pb)$$

As compared with a structure such as the one of FIG. 2, a measurement device which has just been described, allows reduction in the number of electric connections between the sensor and its associated electronics (4 connections instead of 8, each connection corresponding to an apex of a bridge).

Another advantage of this structure is the reduction in the energy consumed by the measurement. Indeed, each bridge is electrically powered and the fact of passing from 2 bridges (each bridge associated with a chamber) to 1 single bridge allows the energy consumption required for the measurement to be divided by 2.

The cabling of the gauges of such a device is also itself much simpler than that of a device according to the prior art, which simplifies the measurement chain. Further, a single amplifier 34 is required. This represents a gain in space and minimization of electric consumption: in a configuration with two bridges, therefore with 3 amplifiers 80, 80', 81, each amplifier has to be powered. Moreover the fact of carrying out the differential measurement before the measurement chain gives the possibility of reducing the risk of degradation of information and therefore minimizing the measurement uncertainty relating to the electronics of the flowmeter.

These different advantages are particularly sought for medical (implantable) applications where it is essential to reduce the size of the electronics, to simplify the information processing and to reduce the electricity consumption, while maintaining an optimum sensitivity level. Moreover, for flows with rapid transients (for example a pump with a membrane and valve generates flow pulses) the calculation of the difference of the measurements on two Wheatstone bridges may involve a complex signal processing operation in order not to lose sensitivity, this problem is no longer posed with a flow rate measurement with a single bridge.

In FIG. 5, the alternative is illustrated, in which the cavities 41, 43 each have a substantially square or rectangular shape in the plane of the device. The other references in this figure designate identical elements or similar to those which have already been described above with the other figures. A sectional view along the axis AA' is identical with that of FIG. 3, and the electric circuit diagram of the measurement bridge is identical with the one described above in connection with FIG. 4B.

Each of the cavities 41, 43 has a square or rectangular shape, each side of which is for example the order of a few millimeters, for example comprised between 1 mm and 10 mm.

The other above considerations, relating to the dimensions of the various device elements, to the materials which may be applied, to the relative arrangement of the gauges, are applied to this alternative.

FIGS. 6A to 6F illustrate, cross-sectionally, different steps of a method for making a flowmeter of the type which has just been described.

A first substrate 20 (FIG. 6A) formed for example from a silicon-on-insulator wafer (SOI for Silicon On Insulator) is considered. An $SiO_2$ layer 20-2 is thus present between two upper 20-1 and lower 20-3 silicon layers.

A second substrate 30 (FIG. 6B) is considered, formed for example from a polished dual face silicon wafer.

The thickness of each of the first and second substrates 20, 30 is of the order of a few hundred microns, for example 700 µm.

The thickness of the lower layer 20-3 of silicon of the first substrate 20 is substantially equal to the thickness of the deformable membranes which will be made subsequently. This thickness may thus be of the order of a few tens to a few hundred microns, for example 10 µm to 300 µm, and preferably 50 µm. As this will be detailed later on, the lower layer 20-3 of the first substrate gives the possibility of accurately defining the thickness of the deformable membranes which will be made.

First both cavities 11, 13 are made in the upper face of the second substrate 30 (FIG. 6B), as well as communication conduits 10, 14 and the restriction 12. By cavity is meant a recess or a notch made in the surface of the second substrate 30.

Figure 6A:
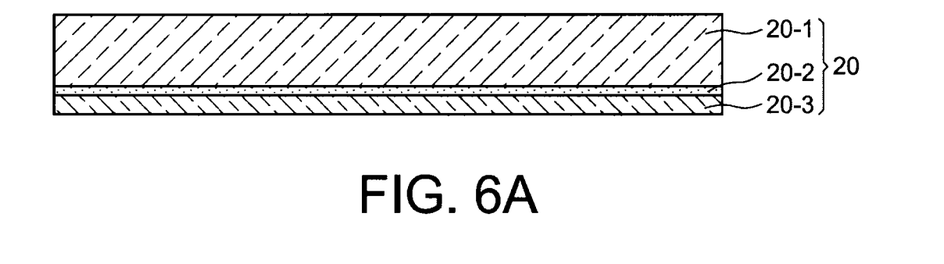
Figure 6B:
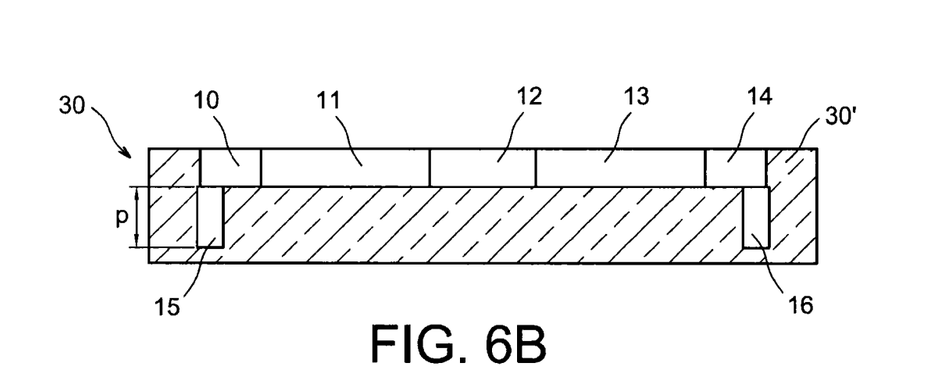

Two cavities 11, 13 are thus obtained.

They are connected together via the communication conduit 12. The inlet 10 and outlet 14 conduits allow them to receive a fluid, the flow rate of which is to be measured, and to then remove this fluid.

Inlet 15 and outlet 16 conduits are made in the form of wells opening into the inside of the upstream 10 and downstream 13 communication conduits respectively. At this stage, they are preferably not yet through-conduits towards the second substrate 30. They may be located in the center of the cavities (since they are preferably intended to open into the center of the cavities). They may have a diameter, measured in the plane of the substrate, of the order of a few hundred microns, or comprised between 100 µm and 800 µm, for example 600 µm, and a depth p of the order of a few hundred microns or comprised between 100 µm and 500 µm, for example 300 µm.

The making of the cavities, of the communication conduits and of the inlet 15 and outlet 16 conduits in the second substrate 30 is carried out from the upper face 30' of the substrate, by conventional micro-electronics techniques, for example by photolithography followed by an etching step. The etching may be with a plasma of the RIE (Rayonic Ion Etching) type, which allows vertical walls to be obtained. These various elements may have the shapes and dimensions already indicated above. The shape is defined by means of mask(s) used during photolithography and etching operations.

The 2 substrates 20, 30 are then assembled to each other (FIG. 6C), the lower layer 20-3 of the substrate 20 being assembled with the upper face 30' of the substrate 30, through which the various cavities 10-14 have been etched.

According to a preferred embodiment, as the first and second substrates 20, 30 are in silicon and in SOI respectively, it is possible to carry out assembling by molecular sealing. This technique is also called sealing by melting, or direct silicon sealing. Other examples of techniques which may be applied for the assembling were given above.

This assembling by molecular sealing includes a first phase for preparing the faces of the substrates 20, 30 intended to be assembled, more specifically a cleaning and hydration phase.

The faces to be assembled of the 2 substrates 20, 30 are thus cleaned with a wet treatment such as RCA cleaning, notably described in the text book of Maluf and Williams entitled <<An introduction to microelectromechanical systems engineering>>. With this cleaning technique, clean and non-contaminated surfaces may be obtained, having a strong density of OH groups. The substrates are then aligned and then put into contact with each other.

Sealing annealing is then carried out at a high temperature for a determined time. The temperature may be comprised between 500° C. and 1,250° C., for example of the order of 1,000° C. and the annealing time may be of the order of one hour. The thereby obtained assembly of the substrates is then solid and long-lasting.

During this assembling, the first substrate 20 has not yet been treated so as to obtain the deformable membrane. The thickness of the first substrate 20 is therefore substantially identical with its initial thickness, i.e. a few hundred microns. Also, the handling of the first substrate 20 before and during the assembling step has low degradation risks by breaking or tearing.

Finally, it should be noted that during this assembling, the inlet 15 and outlet 16 conduits may not be through-conduits. In this case, the assembling step is advantageously carried out in vacuo.

The ambient pressure may be comprised for example between a few $10^{-4}$ mbars and a few $10^{-2}$ mbars. With this it is possible to avoid that by thermal expansion of gases confined in the closed volume formed by the cavities 11, 13 and conduits 10, 12, 14, 15, 16, excessive mechanical stresses be generated inside the substrates, but also in the assembling area between both substrates, by significant overpressures.

The deformable membranes are finally made in the first substrate 20 (FIG. 6D), by thinning the latter over the whole of its surface, from its upper face (the one which is opposite to the face of the layer 20-3 which was assembled with the second substrate 30).

For this purpose, a first mechanical polishing phase of the grinding type may be carried out. This technique is notably described in the article of Pei et al. entitled <<Grinding of silicon wafers: A review from historical perspectives>>, Int. J. Mach. Tool. Manu., 48 (2008), 1297-1307.

The polishing may be stopped at a few microns or tens of microns above the intermediate $SiO_2$ layer 20-2.

The thinning down to the intermediate layer 20-2 may be obtained by the known technique of mechano-chemical polishing of the CMP (Chemical Mechanical Polishing) type.

Alternatively or in combination with this technique, dry etching of the RIE type and/or wet etching by means of a KOH or TMAH (tetramethylammonium hydroxide) bath may be carried out. In the case of dry or wet etching, the $SiO_2$ layer 20-2 has the advantage of being used as a stopping layer, with which it is possible to accurately control the final thickness of the membrane to be formed.

Finally, the intermediate $SiO_2$ layer 20-2 of the second substrate 20 may itself be etched by dry etching of the RIE type or chemical etching with hydrofluoric acid (HF).

Figure 6C:
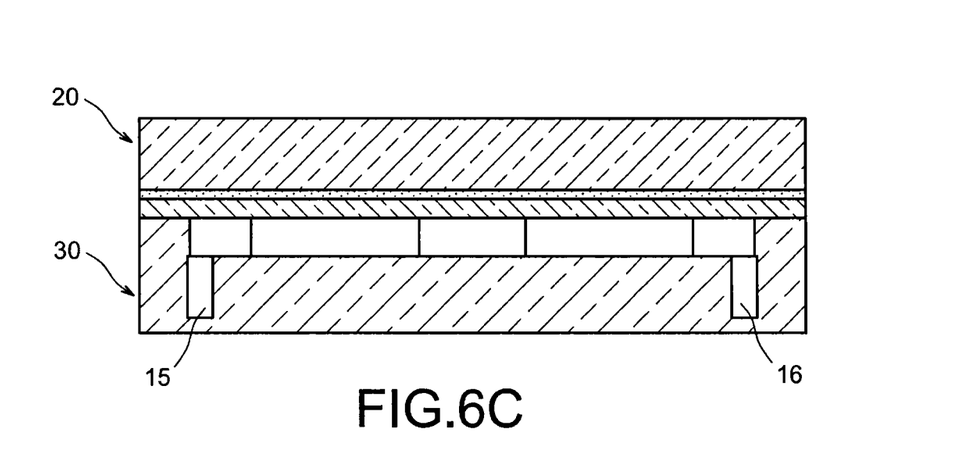
Figure 6D:
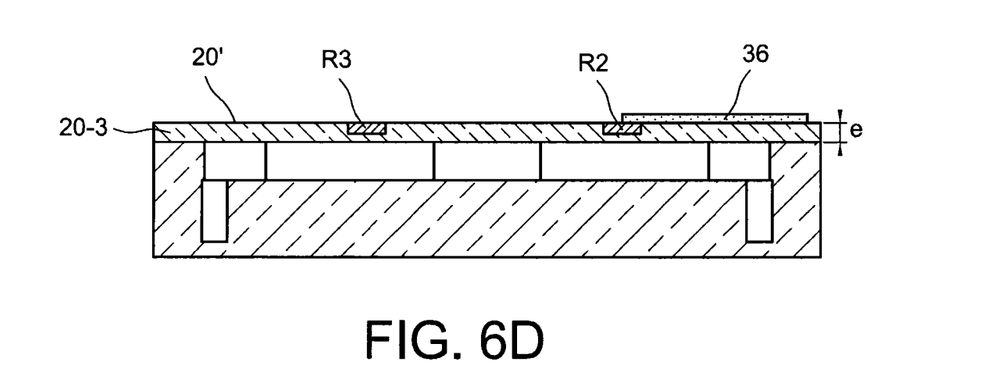

As illustrated by FIG. 6D, the first substrate 20 is then essentially reduced to its lower layer 20-3 and has a substantially planar upper face 20'. This layer does not have any geometrically defined areas intended for forming deformable membranes. Because of the thickness e of this layer, of the order of a few tens to a few hundred microns, for example 10 µm to 300 µm and preferably 50 µm, any area of this layer may form a deformable membrane. The areas of this layer located facing the cavities 11, 13 are the ones which will form the deformable membranes above each of the cavities.

The detection means (resistors R1-R4, connections 36) may then be made by a conducting level on the upper face 20' of the layer 20-3. This conducting level may be in one of the materials already indicated above, and obtained by any deposition technique available in clean rooms, or by implanting ions into a semiconducting material. The gauges are then made directly in the material of the membranes. It is also possible to use the technique described in document WO 2010/92092.

Still alternatively, the gauges R1-R4 may be made by depositing a polysilicon layer at the surface of the membranes. Such a technique is presented in the article of Malhaire et al. entitled <<Design of a polysilicon-on-insulator pressure sensor with original polysilicon layout for harsh environment>>, 2003, Thin Solid Films, 427, 362-366.

Interconnections 36, made on the membrane 20-3, preferably in the same way as the strain gauges R1-R4, electrically connect the latter in order to form the Wheatstone bridge and connect the assembly to processing means 34, 35 and powering means 37 (FIG. 4B).

Figure 6E:
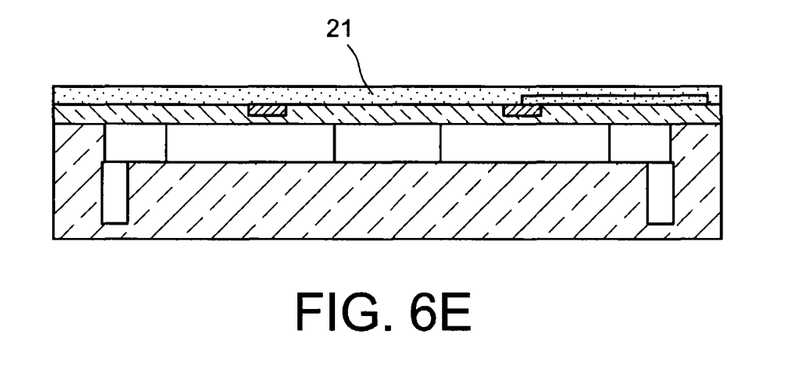
Figure 6F:
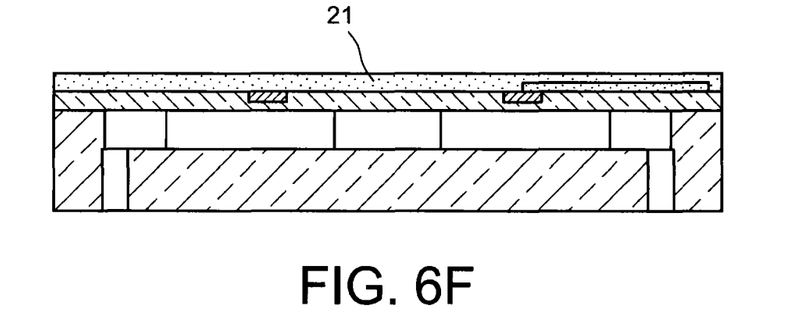

FIG. 6E shows that an electrically insulating layer 21, for example based on a dielectric such as $SiO_2$, may be positioned on the substrate, thus covering the stain gauges R1-R4 and the interconnections 36.

Other sensors of deformations may be made at this stage on the membranes 11', 13', for example in order to measure the pressure in either one or both of the membranes.

In a preferred embodiment of the method according to the invention, the inlet 15 and outlet 16 conduits are not yet through-conduits. An etching step is then carried out on the lower face of the second substrate 30 (FIG. 6F) in order to make through-conduits out of said conduits. The fluidic circuit of the flowmeter, including the inlet 15 and outlet 16 conduits, the cavities 11, 13 as well as communication conduits 10, 12, and 14, is then open and communicates with the external environment.

This step is advantageously carried out at the end of the manufacturing method. With this it is possible to avoid contamination of the inside of the fluidic circuit with any kinds of residues or impurities. The risk of clogging or polluting the whole of the network is thus suppressed.

An advantage of a method according to the invention is that it only requires the etching of a single one of the two faces to be put into contact during the assembling operation of FIG. 6C. On the contrary, a structure such as the one of FIG. 1 applies etching of the substrates 62, 64.

Finally, in the case when a plurality of flowmeters is made simultaneously from a wafer forming the first substrate and from a second wafer forming the second substrate, the wafers are cut out in order to individualize the thereby manufactured components.

The invention claimed is:

1. A flowmeter, comprising:
a first chamber and a second chamber connected through a channel, wherein
the first chamber is provided with a wall including a first deformable membrane, which extends in the direction of flow of a fluid in the first chamber, and with first and second gauges, on or in the first deformable membrane, and
the second chamber is provided with a wall including a second deformable membrane, which extends in the direction of flow of a fluid in the second chamber, and with third and fourth gauges, on or in the second deformable membrane, the four gauges forming a Wheatstone bridge with which a pressure difference between the first chamber and the second chamber may be measured when a fluid flows through the first chamber, and then through the channel, and then through the second chamber.

2. The flowmeter according to claim 1, wherein the 4 gauges have identical rated values.

3. The flowmeter according to claim 1, wherein the 4 gauges of said Wheatstone bridge are not all parallel with each other, and/or the 2 gauges of the bridge of a same membrane are not parallel with each other.

4. The flowmeter according to claim 1, wherein the Wheatstone bridge includes 2 successive gauges parallel with each other.

5. The flowmeter according to claim 1, wherein one of the gauges of each membrane is placed along a direction perpendicular to the general direction of flow of a fluid in the flowmeter, while the other gauge is placed along a direction substantially parallel to this general direction of flow of fluid in the flowmeter.

6. The flowmeter according to claim 1, wherein the 2 membranes are identical.

7. The flowmeter according to claim 1, wherein each of the gauges is localized in the vicinity of the anchoring or of the edge of the corresponding membrane.

8. The flowmeter according to claim 1, wherein each of the gauges is in a conducting material or in a doped semiconducting material.

9. The flowmeter according to claim 1, wherein each of the gauges has a width comprised between 1 µm and 10 µm and a length comprised between 10 µm and 100 µm.

10. The flowmeter according to claim 1, further comprising at least one additional sensor.

11. The flowmeter according to claim 1, wherein the deformable membranes have a thickness comprised between 10 µm and 300 µm.

12. The flowmeter according to claim 1, further comprising measurement means, including amplifier means to which are connected 2 apices of the bridge which are not positioned in the vicinity of each other in the bridge.

13. A method for making a flowmeter according to claim 1, comprising:
a) selecting a first substrate and a second substrate,
b) making the first chamber, the second chamber and the channel in the second substrate,
c) assembling the first substrate with the second substrate,
d) making a deformable membrane by thinning the first substrate,
e) forming the 4 gauges, forming a Wheatstone bridge, on or in said membrane, two of the gauges being positioned above the first chamber and the two other gauges being positioned above the second chamber.

14. The method according to claim 13, wherein the deformable membrane is made by thinning the first substrate from the upper face of the first substrate, by mechanical polishing, or by mechano-chemical polishing and/or by etching.

15. The method according to claim 13, wherein the first substrate is of the SOI type, including a semiconducting substrate, a dielectric layer and a layer in semiconducting material.

16. The method according to claim 15, wherein the dielectric layer is used as a stopping layer during the thinning of the first substrate.

17. The method according to claim 13, further comprising making inlet and outlet conduits in the second substrate.

18. The method according to claim 17, wherein the inlet and outlet conduits are first made blind in the second substrate, and then made as through-conduits after step e), by thinning of the second substrate.

19. The method according to claim 13, wherein the assembling is carried out by molecular sealing, or by anodic, or eutectic sealing or by adhesive bonding.

20. The method according to claim 13, wherein the assembling is carried out in vacuo.

21. The method according to claim 13, wherein the gauges are made by metal deposition on the membrane or by doping a semiconducting material.

22. The flowmeter according to claim 10, wherein the at least one additional sensor measures pressure in at least one of the chambers.

* * * * *